Nov. 15, 1949  J. W. JOHNSON ET AL  2,487,877
EGG CANDLING MACHINE OF THE POWER-DRIVEN TYPE
Filed Aug. 12, 1946  4 Sheets-Sheet 1

INVENTOR.
JAMES W. JOHNSON
DONALD Q. PARK
BY James M. Abbett
ATTY.

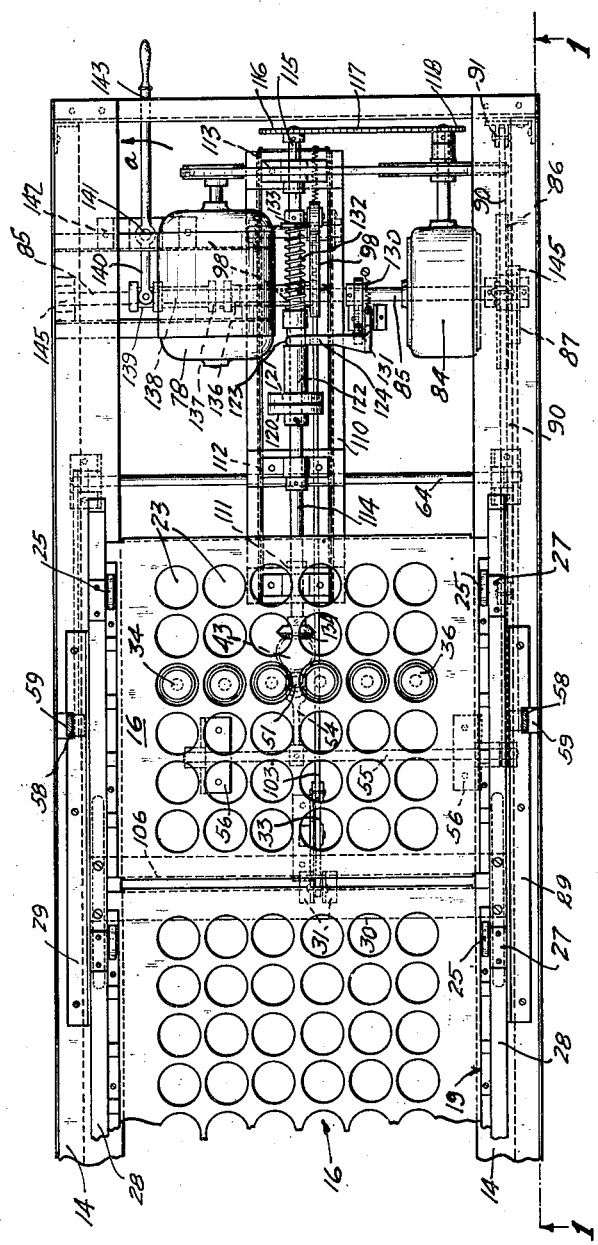

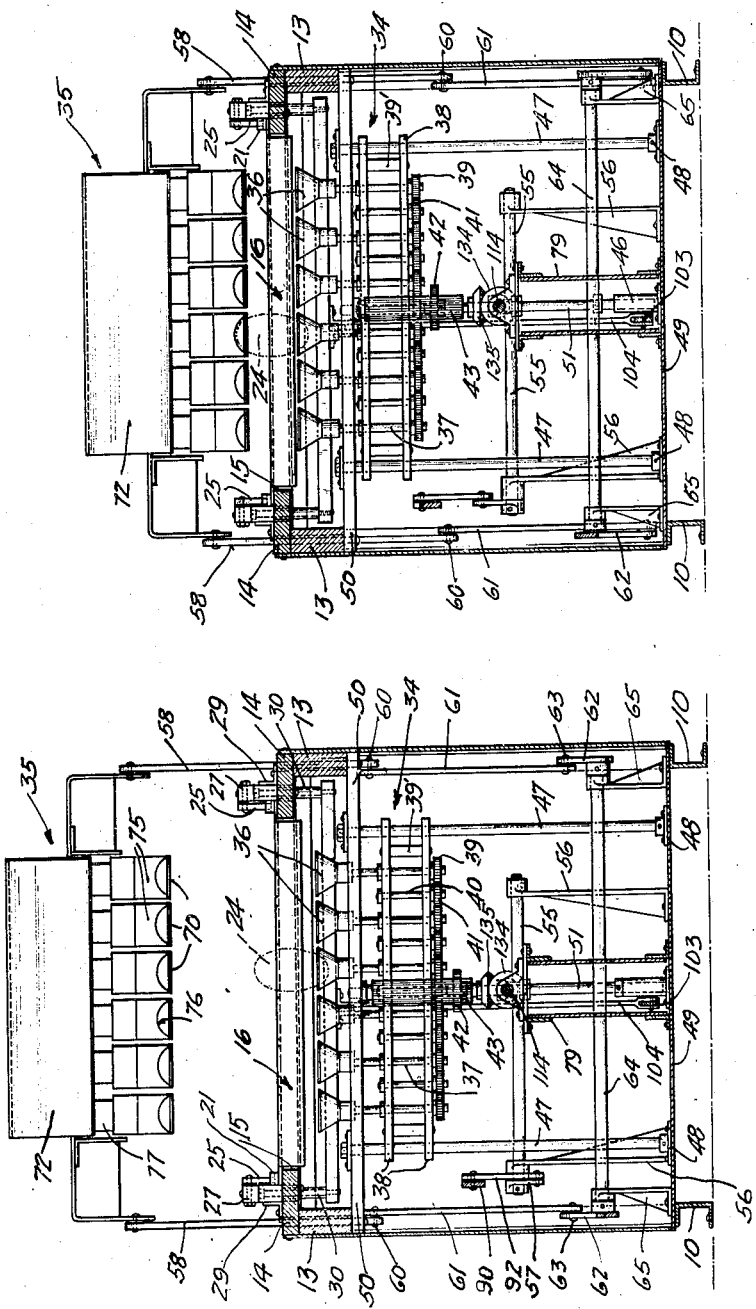

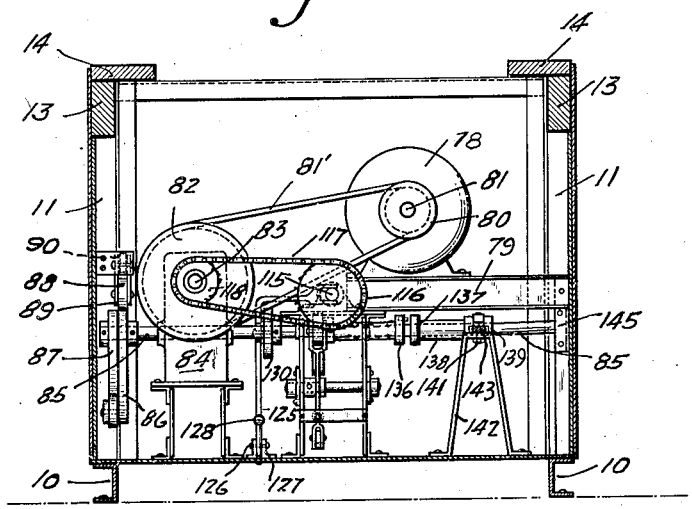
Fig. 5
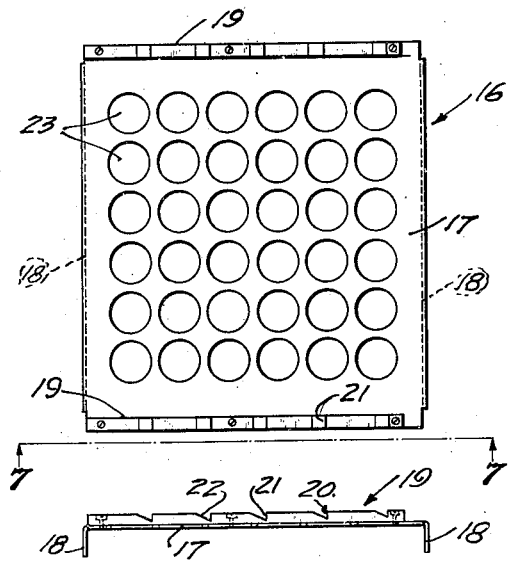
Fig. 6
Fig. 7
INVENTOR.
JAMES W. JOHNSON
DONALD Q. PARK
BY James M. Abbett
ATTY.

Patented Nov. 15, 1949

2,487,877

UNITED STATES PATENT OFFICE 2,487,877

EGG CANDLING MACHINE OF THE POWER-DRIVEN TYPE

James W. Johnson, Highland Park, and Donald Q. Park, Los Angeles, Calif.

Application August 12, 1946, Serial No. 689,960

7 Claims. (Cl. 88—14.5)

This invention relates to a device for use in the produce industry, and particularly pertains to an egg candling machine.

In U. S. Letters Patent No. 2,150,375, entitled "Egg candling machine," issued on March 14, 1939, to James W. Johnson, one of the co-inventors herein, an egg candling machine was shown in which eggs were mounted in spinning cups and thereafter lifted by a supporting platform to a position where they were within the beam of light from illuminating devices and were tested. In actual practice this machine was demonstrated as being operable and satisfactory but in order to handle a large quantity of eggs rapidly, without breakage, and to efficiently candle the eggs, it has been deemed desirable to design a structure in which trays of eggs are supported with their major axes extending vertically and arranged in rows in which the individual eggs are spaced equidistant from each other, such a structure including means whereby successive rows of eggs may be lifted from the trays in individual spinning cups and whereby illuminating means will move toward the lifted eggs to make it possible to candle the eggs while they are spinning continuously. It is the principal object of the present invention, therefore, to provide an egg candling machine, the fundamental feature of which is to spin an egg on its vertical axis while subjecting it to the light from a source of illumination whereby the egg may be observed and candled as it spins, the structure including means by which the eggs may be consecutively moved to and away from the candling station and may be positioned automatically with relation to a source of illumination at said station while the spinning motion is imparted to the egg.

The present invention contemplates the provision of a base structure having a guideway thereon to receive trays, each tray having openings therethrough within which eggs may be positioned with their major axes disposed vertically, said base structure carrying means for automatically moving said trays in a step-by-step motion with relation to a candling station, the candling station being defined by spinning cups disposed beneath the tray and illuminating means disposed above the tray, said structures being fitted with driving and moving means whereby the spinning cups will lift eggs from the tray and the illuminating means will move downwardly to a candling position over the lifted eggs.

The invention is illustrated by way of example in the accompanying drawings in which:

Fig. 2 is a fragmentary view in plan showing the candling machine as viewed on the line 2—2 of Fig. 1.

Fig. 3 is a view in transverse vertical section through the candling machine as seen on the line 3—3 of Fig. 1 and indicates the spinning cups and the illuminating devices in their separated positions.

Fig. 4 is a view similar to Fig. 3 indicating the spinning means and the illuminating means in their candling positions.

Fig. 5 is a view in transverse vertical section through the machine as seen on the line 5—5 of Fig. 1 and discloses certain details of the drive mechanism.

Fig. 6 is a view in plan showing one of the egg trays dissociated from the machine.

Fig. 7 is a view in end elevation showing one of the egg trays as seen on the line 7—7 of Fig. 6.

Figure 1:
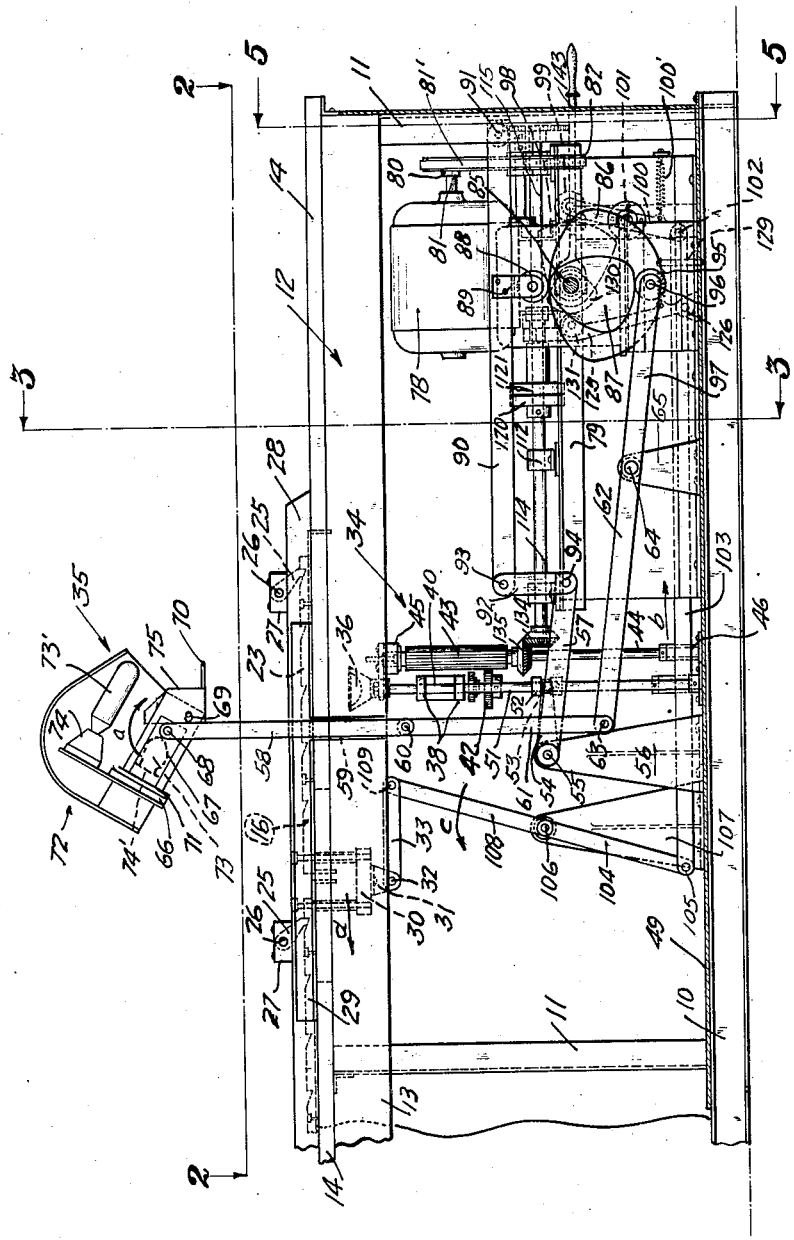
Figure 1 is a view in side elevation showing the egg candling machine with a section of its guideway removed for the sake of convenience, the view being taken on the line 1—1 of Fig. 2.

Referring more particularly to the drawings, 10 indicates bottom rails which rest upon the floor and form a base for the egg candling machine. Extending vertically from these rails are structural elements 11 forming corner posts and uprights to support a top structure 12. The top structure 12 includes side timbers 13 which are disposed vertically at opposite sides of the main base structure and upon which horizontal rails 14 are mounted. These rails extend inwardly from opposite sides of the top structure 12 and provide an intermediate space 15 which extends longitudinally of the entire top structure 12. It is intended that the rails 14 shall act to support and guide egg trays 16. The structural details of these trays are more particularly shown in Figs. 6 and 7 of the drawings. Here it will be seen that the tray is formed of a plane sheet metal portion 17, the front and rear edges of which are bent downwardly, as indicated at 18. The width of the plane portion 17 is greater than the width of the space 15 between the guide rails 14; thus, the opposite edges of the plane portion 17 will rest upon the upper faces of the guide rails 14. The down-turned members 18 are shorter than the overall width of the tray, and in fact are of a length to extend downwardly between the opposed vertical faces of the rails 14 and into the space 15. This acts as a guide for the tray. Mounted upon the opposite upper overhanging edges of the plane portion of the tray are ratchet racks 19. These racks are secured to the upper face of the tray and are formed with teeth 20 having vertical forward edges 21 and inclined faces 22. The plane surface 17 of the tray is formed with a plurality of egg receiving seats 23. These are formed by making perforations through the sheet metal tray, and it is preferable that these seats be spaced uniformly from each other, both longitudinally and laterally of the tray; thus, the seats will be arranged in rows extending transversely of the tray, and the transverse rows will be spaced equidistant from each other. The diameter of the openings forming the seats is such as to insure that when eggs, as indicated at 24, are disposed within the seats with their major axes vertical that they will be held in this position. It is to be understood that when using this machine the eggs have been previously graded so that they will be substantially uniform in size, and that trays 16 have been selected with seats 23 which will properly accommodate the particular grade of eggs.

The trays are intermittently moved longitudinally of the guide rails 14 by pawls 25. These pawls are mounted upon horizontal pivots 26 carried by blocks 27. The blocks 27 are mounted upon feed bars 28 which are disposed at the opposite sides of the path of travel of the trays 16 and are guided longitudinally by angle bars 29. The feed bars 28 are secured to a yoke 30 having a bracket 31 extending downwardly therebeneath to carry a pivot pin 32. The pivot pin 32 is fitted with a link 33 which leads to operating mechanism. The details of construction of the operating mechanism will be described hereinafter. It should be explained that the vertical shoulders 21 on the ratchet racks 19 are spaced a distance apart equal to the space from center to center of the rows of egg seats 23, and that the crosshead 30 will reciprocate horizontally a distance sufficient to cause the pawls 25 to engage the ratchet teeth and to advance the egg tray the distance between two successive rows of eggs at each actuation.

The feed operation previously described is provided in order to move successive rows of eggs to a candling station. At this station an egg spinning unit 34 is provided and disposed beneath the path of travel of the egg trays 16, and illuminating units 35 are provided and are disposed above the path of travel of the egg trays 16. The spinning unit 34 includes a plurality of spinning cups 36. These cups are mounted on spindles 37 which extend through bars 38. A pair of these bars is provided. Spacing blocks 39' hold the bars in suitable spaced relation to each other. The spindles 37 extend completely through both of the bars 38. At the lower end of each spindle is a gear pinion 39 which is fixed to the spindle. Between adjacent spindles 37 are idler spindles 40. These spindles carry idler gear pinions 41 which mesh with the two adjacent pinions 39, thus insuring that all of the spindles 37 will rotate in the same direction when driven at any one point in the gear train. The centermost idler spindle 40 extends downwardly, as shown in Fig. 1 of the drawing, and receives a drive gear 42. The drive gear 42 is in mesh with a drive pinion 43 which is mounted upon a shaft 44. The shaft 44 is rotatably supported in an upper bearing 45 and in a lower bearing 46. As will be hereinafter explained, the spinning unit 34 is designed to be bodily raised and lowered incident to the operation of the machine. It is also intended that during these movements the spinning cups 36 shall be in rotation continuously. For that reason the length of the pinion 43 is greater than the length of stroke of the spinning unit so that the gear 42 will always be in mesh with the driving pinion 43. The power source and power transmission mechanism connected with the shaft 44 will be described hereinafter.

The bars 38 which form the crosshead of the spinning unit 34 are mounted to reciprocate vertically upon guide bars 47. These guide bars are secured within foot members 48 fastened to the transverse floor portion 49 of the frame and at their upper ends are secured to a cross-rail 50 which extends horizontally from one of the side members 13 to the other. A rod 51 extends downwardly from the bars 38 and carries a grooved collar 52 which receives a pin 53 carried on the free end of a lifting arm 54. The lifting arm 54 is mounted upon a horizontal pivot shaft 55. This shaft is supported by brackets 56 resting upon the floor 49 of the base structure. Fixed to the pivot shaft 55 is a power lever 57 which is oscillated by means to be hereinafter described.

The illuminating unit 35 is designed to move bodily and vertically above the egg trays 16. This unit is supported upon a pair of vertical posts 58 which reciprocate vertically through slotted guide openings 59 formed through the side rails 13 of the frame. The lower ends of the posts 58 carry pivot pins 60 by which links 61 are pivotally connected to the posts. These links 61 are pivotally connected at their lower ends to a power lever 62 by pins 63. The power levers 62 are mounted upon a shaft 64. The shaft 64 is carried by a bracket 65 which is secured to the floor 49.

The illuminating unit includes a frame structure 66. This frame structure has opposite end portions 67 which carry trunnions 68. The trunnions 68 extend through openings in the upper ends of the posts 58. This makes it possible to swing the illuminating unit around the horizontal axis of the trunnion 68 when desired. Pins 69 limit the swinging movement of the illuminating unit 35 in the direction of the arrow a, as shown in Fig. 1. By reference to Fig. 1 it will be seen that the illuminating unit 35 will be disposed with its frame portion 67 inclined. This causes guard loops 70 carried at the bottom of the structure 67 to extend horizontally so that they will fit down and around the upper end of an egg during the candling operation. An inclined back wall 71 extends upwardly and rearwardly from the horizontally disposed guide loops and provides a reflector surface. Mounted over the frame structure 66 is a reflector hood 72 which is substantially U-shaped in cross-section and has a forward portion which extends downwardly and forwardly to shield the eyes of the operator of the machine from the illumination of lamps 73 and 73'. These lamps are mounted in sockets 74 and 74' disposed beneath the hood and carried by the frame 66. A plurality of downwardly extending shield members 75 are associated with the housing 35 as indicated in Figs. 3 and 4 of the drawings. These shields have a lower concave edge 76 which will conform substantially to the upper end of an egg when in contact therewith, as shown in Fig. 4 of the drawings. The shields are separately mounted so that they may have separate vertical movement upon members 77. This makes it possible for the shields to adapt themselves to the size and contour of the eggs with which they contact during a candling operation.

The lamps 73 are disposed upwardly and rearwardly of the position to be assumed by an egg during the candling operation and are mounted in the rear of the shields 75, one of the lamps 73 being behind each of the shields 75. These lamps thus project a beam of light into the egg being candled so that the contents of the egg may be observed after the egg has ceased to spin with the spinning cups 36 and while the white and yolk of the egg are still spinning within the shell. The lamps 73' are provided to illuminate the exterior of the shell so that the operator may observe the color and condition of the shell. A suitable switch is provided and is operated in synchronism with the egg spinning device to establish electric circuits alternately through the lamps 73 and 73'. In this way the exterior of the eggs may be inspected while the eggs are being lifted and lowered, and the interior of the egg can be inspected while the cups 36 stand stationary and the eggs are disposed in register with the shields 75.

The various operating units, previously described, are intended to be driven in synchronism from an electric motor 78. This motor is mounted upon a subframe 79 and is fitted with a driving pulley 80 carried upon the armature shaft 81. The driving pulley 80 carries a belt 81' leading to a driven pulley 82. The driven pulley 82 is mounted upon a shaft 83. This shaft leads to a reduction gear unit 84. This unit drives a cam shaft 85. This shaft extends horizontally from the opposite sides of the gear reduction unit. Mounted upon the portion of the shaft 85 upon the outer side of the gear reduction unit are a spinning unit lifting cam 86 and an illuminating unit lifting cam 87. The spinning unit lifting came is engaged by a cam roller 88 rotatably supported upon an arm 89 which is fixed to a power lever 90. The lever 90 is mounted upon a fixed pin 91 at one end and is pivoted to a shackle 92 by a pin 93 at its opposite end. The lower end of the shackle is connected with the lever arm 57 by a pin 94. The cam 87 is engaged by a roller 95 which is mounted upon a pivot pin 96. This pin is carried upon the free end of a lever arm 97 which is fixed to the shaft 64. The lever arms 62 are also fixed to this shaft so that as the arm 97 oscillates the illuminating unit will be raised and lowered. Mounted upon the shaft 85 is a cam 98. This cam is shown in Fig. 2 of the drawings as being positioned substantially midway the length of the shaft 85 upon a clutch sleeve 98' which may rotate freely with relation to the shaft 85. This sleeve may be locked to rotate with the shaft by a clutch mechanism to be hereinafter described. The cam 98 is engaged by a roller 99 carried by an oscillating lever 100. The lever 100 is mounted on a pivot shaft 101 intermediate its ends. At one end of the lever 100 is mounted the cam roller 99. The opposite end of the lever 100 is pivoted at 102 to a pitman rod 103. This rod extends horizontally and is secured to a lever arm 104 by a pivot pin 105. The lever arm 104 is mounted upon a pivot pin 106 which is carried upon a standard 107. An upper extension 108 of the lever arm is pivotally connected to the link 33 by a pivot pin 109. The levers and linkage between the cam roller 99 and the crosshead 30 thus act to feed the tray 16 forwardly in a step by step motion, as will be hereinafter described.

A subframe structure 110 is disposed centrally of the machine, as shown in Fig. 2 of the drawings, and carries bearings 111, 112 and 113 which receive longitudinally aligned shafts 114 and 115. The shaft 115 carries a sprocket 116 around which a driving chain 117 is led. This chain also passes around a sprocket 118. The sprocket 118 is mounted on the end of the drive shaft 83 of the reduction unit 84. Mounted upon contiguous ends of the shafts 114 and 115 are clutch elements 120 and 121. The element 120 is fixed to the shaft 114 while the element 121 is longitudinally movable on the shaft 115. The clutch element 121 has a hub 122 formed with an annular groove 123. This groove receives the fingers of a fork 124 which is mounted upon an oscillating arm 125. The arm 125 is mounted upon its lower end at a fixed pivot 126 carried by a bracket 127. A spring 128 secured to a post 129 tends to draw the lever arm 125 toward the shaft 85. Mounted upon the shaft is a clutch cam 130 which is engaged by a cam roller 131 carried by the lever arm 125. Mounted upon the shaft 115 is a spring 132 which tends to urge the clutch elements 120 and 121 toward each other. This spring is interposed between the end of the hub 122 and a collar 133. At the outer end of the shaft 114 is a bevel pinion 134 which is in mesh with a bevel pinion 135 carried upon the shaft 44. These pinions drive the shaft 44 and the long spur gear pinion 43.

The cam shaft 85 carries the illuminating unit lifting cam 87, the spinning head lifting cam 86, and the clutch shifting cam 130, all of which cams are fixed with relation to the shaft. The shaft 85 also carries the cam 98 and its sleeve 98'. This cam, however, is freely rotatable upon the shaft 85. It is optionally locked with relation thereto by a clutch structure comprising a clutch element 136 which is fixed on the end of the sleeve 98'. A complementary clutch element 137 is carried by a sleeve 138 which is splined onto the shaft 85. This sleeve is fitted with a shifting collar 139 which receives a shifting fork 140 by which the sleeve may be longitudinally reciprocated on the shaft 85. The fork 140 is mounted upon a pivot 141 carried by a bracket 142. The fork is also fixed to a shifting lever 143. By this arrangement, therefore, it is possible to set and release the clutch elements 136 and 137 by manual operation. When these clutch elements are set the tray feed cam 98 will be locked to the shaft 85 and the step by step feed movement of the trays 16 will be brought about. It is to be understood that the opposite ends of the shaft 85 may be rotatably supported in bearings 145 carried by the frame of the machine.

In operation of the present invention the machine is assembled as here shown. Eggs are placed on successive trays 16 with their major axes disposed vertically and with the eggs seated within the seat openings 23 formed in the tray. The trays are then deposited upon the guide rails 14 and are moved forwardly until the forward teeth 20 on the ratchet bars 19 are engaged by the pawls 25. When in this position the motor 78 may be started. This will cause the shaft 83 to be driven continuously as well as the cam shaft 85 and the spinning drive shaft 115. In the initial position of operation the various elements of the machine will be in the position shown in Fig. 1 of the drawing. Here it will be seen that the tray feed crosshead 30 is in its forward position and that the illuminating structure 35 is in its uppermost position while the egg spinning structure 34 is in its lowermost position. At this same time the clutch elements 120 and 121 will be disengaged so that the spinning cups will not be rotated, and usually the clutch elements 136 and 137 are out of engagement due to manual manipulation of the shifting lever 143. The lever 143 may then be swung in the direction of the arrow a, as indicated in Fig. 2 of the drawings. This will cause the clutch elements 136 and 137 to engage each other so that the cam 98 will be locked to the shaft 85 and will be driven thereby. This cam acts upon the cam roller 99 which causes the lever 100 to oscillate upon its pivotal axis 101. The lower end of the lever pulls the draw-bar 103 in the direction of the arrow b as shown in Fig. 1, and this in turn will swing the lever arm 108 in the direction of the arrow c shown in Fig. 1. The crosshead 30 will then move horizontally in the direction of arrow d, shown in Fig. 1, so that the pawls 25 will ride over the ratchet bars 19 and rearwardly thereof to a point of engagement with the shoulder 21 on the next succeeding tooth of the ratchet bars 19 so that reverse oscillation of the lever arm 108 will advance the tray 16 the width of one row of seats 23. It will be understood that the cam roller 99 will be held in contact with the cam 98 by action of the spring 100'.

As the tray 16 is moved forwardly to a position in vertical alignment with the longitudinal vertical axes of the spinning cups 36 the clutch cam 130 will engage the cam roller 131 and swing the lever arm 125 so that the clutch element 121 will move into driving engagement with the clutch element 120. This will cause the shaft 114 to be driven. Rotation will then be imparted to the long spur gear pinion through the bevel gears 134 and 135. The spur gear pinion will then impart a rotary motion to the gear 42 in mesh therewith, and this will be imparted in turn to the various spindles 37 carrying the spinning cups 36. As has been previously explained, the spinning cups 36 are rotated simultaneously in the same direction due to the arrangement of a gear train which includes meshing spur gears 39 and 41. The axial position of the cam 130 is so disposed with relation to the axial position of the cam 98 as to cause the clutch members 120 and 121 to begin to engage each other as the feed motion is interrupted.

Attention is directed to the fact that the axial positions of the lifting cams 86 and 87 are substantially at right angles to those of the cams 98 and 130. Thus, when the cups 36 are spinning at their maximum revolution the cam 86 will begin lifting the lever arm 90 through engagement with the cam roller 88. This motion will be imparted through the lever 57 and the pivot shaft 55 to the lever arm 54. The lever arm 54 will then act through the lift rods 51 to raise the spinning head 34 bodily. Attention is directed to the fact that the swell on the cam 86 represents substantially 180°, and that the curved portions between the swell and dwell sections of the cam surface are connected by a relatively smooth progressive surface which will insure that when the spinning cups 36 move upwardly to engage and lift the eggs and when these spinning cups move downwardly to place the eggs in the seats 23 the motion will not be violent, and there will not be any possibility for the eggs to be damaged. It is also to be pointed out that the rise on the cam 87 is quite abrupt, and that the dwell portion of the cam is relatively short as compared with the arcuate length of the dwell upon cam 86. This will cause the illuminating device to be lowered rapidly and to be rapidly raised in an interval of time during which the spinning unit 34 is in its raised position.

When the illuminating structure 35 is lowered to the position shown in Fig. 4 of the drawings the guard rings 70 will fit around the end sections of the eggs carried by the spinning cups 36 and will tend to steady the eggs as they spin. The shield members 75 will move down and rest upon the upper ends of the eggs, after which time the eggs will be illuminated so that the operator may inspect them before the illuminating unit 35 is lifted to the position shown in Figs. 1 and 3, and before the spinning unit 34 is lowered to the position shown in Figs. 1 and 3.

It will thus be seen that by the structure here disclosed it is possible to feed eggs through a candling machine automatically and at a high rate of speed, during which time the eggs may be moved toward and away from a candling station and may be lifted by spinning means while an illuminating structure is simultaneously lowered over the eggs to be candled.

While we have shown the preferred form of our invention as now known to us, it will be understood that various changes may be made in combination, construction and arrangement of parts by those skilled in the art, without departing from the spirit of the invention as claimed.

Having thus described our invention, what we claim and desire to secure by Letters Patent is:

1. An egg candling device including a supporting frame defining an egg candling station, means for receiving an egg and supporting the same with its major axis disposed vertically, means for moving the egg support to a position in register with the egg candling station and for removing it from said station, means for lifting the egg free of said egg carrying means when the egg support is in register with said candling station, means for imparting a spinning motion to the egg lifting means at said egg candling station, means for illuminating the egg at said egg candling station, means for lowering the illuminating means over the egg while it is lifted and is spinning at said egg candling station, and drive means for the aforesaid instrumentalities.

2. An egg candling machine comprising a main frame structure having means defining an egg candling station at a point in the length thereof, a guideway on said frame, egg trays supported on said guideway for movement horizontally along said guideway to and from the candling station, said trays being formed with a plurality of uniformly spaced rows of openings providing seats to receive eggs individually and to support them with their major axes disposed vertically, the dimensions of the openings being such that the eggs will rest on said seats with a portion normally projecting above the plane of the tray and a portion normally projecting below the plane of the tray, feed means disposed at opposite sides of the guideways for engaging a tray and advancing it along the guideways a distance represented by the space between rows of egg seats on the tray, a spinning head carried by the main frame and disposed beneath the horizontal path of travel of the trays at the egg candling station, said spinning head including a row of egg lifting cups, the individual cups registering with individual seats in a row of egg seats of the egg carrying tray, means for simultaneously spinning said cups in unison and in a single direction, egg illuminating means disposed above the path of travel of an egg tray at the egg candling station, said illuminating means including a light housing within which a light source is disposed and a plurality of individual shields in front of said light source adapted to be brought to rest against the contour surface of the upper ends of a row of eggs for shielding the light around said portion of the eggs, means for initiating and interrupting the drive of said spinning cups while a row of eggs on the egg tray is in register with the candling station, means for raising and lowering the spinning head with the cups when a row of eggs is in register with said candling station whereby the eggs will be lifted from the tray and will be supported as they spin, means for lowering and lifting the illuminating means to and away from a candling position over the eggs in said row when the eggs have been lifted from the tray and are spinning, and drive means for said units.

3. An egg candling device including a supporting frame defining an egg candling station, a pair of spaced horizontal guide rails carried by the supporting frame extending horizontally from said station to receive a movable egg tray and to direct it along a longitudinal path to and away from said station, egg trays mounted on said rails for movement along said guide rails, said trays having a body panel formed with a plurality of rows of openings within which eggs may seat with their major axes vertically disposed, ratchet bars carried at opposite edges of the trays, feed heads disposed on said rails at opposite sides of the trays and each carrying a pawl to engage the teeth of one of said ratchet bars, means for reciprocating said feed heads whereby a tray resting upon said guide rails will be fed forwardly a predetermined distance at intervals, means at the egg candling station for lifting eggs free of said egg carrying means, means for imparting a spinning motion to the egg lifting means at said egg candling station, means for illuminating the egg at said egg candling station, and synchronous driving means for the means for reciprocating said feed heads to feed the tray forwardly a predetermined interval, the egg lifting means at the candling station during the interval of rest of the tray, the egg spinning means while the egg is lifted, and the egg illuminating means at the same time.

4. An egg candling device including a supporting frame defining an egg candling station, a horizontal guideway therealong, an egg carrying tray movable along said guideway, said tray being formed with parallel rows of openings spaced at equal intervals longitudinally of the tray and with the openings in said rows spaced at equal intervals along the rows, the diameters of said openings being less than the diameter of eggs which are seated within said openings and disposed with their axes vertical, an egg illuminating unit mounted for vertical reciprocation at said egg candling station and designed to move downwardly to produce illumination of a row of eggs at the candling station, a series of spinning cups normally disposed beneath the plane of travel of the egg carrying tray, a supporting framework therefor designed to reciprocate vertically with relation to the frame of the machine and support the spinning cups with their vertical axes concentric with the centers of a row of openings on the egg carrying tray, a drive shaft rotatably mounted upon the frame, a driving structure between the drive shaft and the egg carrying tray to feed the tray forwardly and intermittently and to bring rows of eggs into register with the candling station successively, a drive structure between said drive shaft and the spinning cup supporting frame whereby the frame with the spinning cups will be raised to lift the eggs from the carrying tray and to lower the eggs onto the carrying tray after a predetermined interval, an operating mechanism between the drive shaft and the illuminating unit whereby said illuminating unit will be lowered to a candling position over the eggs as a row of eggs is lifted to said candling position, and drive means between the drive shaft and the egg spinning cups whereby the egg spinning cups will be rotated when the cups have been lifted to an egg candling position.

5. An egg candling machine comprising a main frame including a pair of spaced horizontal guide rails to receive a movable egg tray and to direct it through the machine, egg trays adapted to be moved along said guide rails, said egg trays each having a body formed with a row of openings within which eggs may seat, a ratchet bar carried by each tray, a feed head disposed adjacent said rails carrying a pawl to engage the teeth of said ratchet bar, a candling station including an illuminating unit, drive means for reciprocating said feed head to periodically feed a tray a predetermined distance along said rails to successively bring a row of eggs mounted in said openings of said tray to said candling station, a spinning unit at said candling station comprising a vertically movable frame, a plurality of rotatable spindles carried by said frame equal in spacing and number to the openings of said row and disposed with parallel vertical axes in alignment with a row of tray openings when a tray is moved to the candling station, individual egg spinning cups mounted on the end of each spindle to engage an egg carried by the tray when the tray is lifted, a gear mounted on each of said spindles, intermediate idler gears rotatably supported on said frame and meshing with said spindle gears at opposite sides thereof forming a spindle drive train, means actuated by said driving means for lifting and lowering said unit between periods of motion of said tray and when a row of eggs is in registration with said cups, and means actuated by said drive means for imparting driving movement to the spindle gears when the frame is lifted.

6. An egg candling machine comprising a main frame including a pair of spaced horizontal guide rails to receive a movable egg tray and to direct it through the machine, egg trays adapted to be moved along said guide rails, said egg trays each having a body formed with a row of openings within which eggs may seat, a ratchet bar carried by each tray, a feed head disposed adjacent said rails carrying a pawl to engage the teeth of said ratchet bar, a candling station including an illuminating unit, drive means for reciprocating said feed head to periodically feed a tray a predetermined distance along said rails to successively bring a row of eggs mounted in said openings of said tray to said candling station, a spinning unit at said candling station comprising a vertically movable frame, a plurality of rotatable spindles carried by said frame equal in spacing and number to the openings of said row and disposed with parallel vertical axes in alignment with a row of tray openings when a tray is moved to the candling station, individual egg spinning cups mounted on the end of each spindle to engage an egg carried by the tray when the tray is lifted, a gear mounted on each of said spindles, intermediate idler gears rotatably supported on said frame and meshing with said spindle gears at opposite sides thereof forming a spindle drive train, means actuated by said driving means for lifting and lowering said unit between periods of motion of said tray and when a row of eggs is in registration with said cups, and means actuated by said drive means for imparting driving movement to the spindle gears when the frame is lifted, said means comprising a vertically disposed gear extending parallel to said spindles and in constant mesh with a gear in said spindle drive train, the length of said vertical gear being greater than the vertical movement of the spindle unit, a shaft geared to drive said vertically extending gear, a drive actuated by the drive means, a clutch between said shafts for establishing and interrupting driving operations of the spindles, a cam shaft actuated by said drive means, cam means driven thereby for actuating said clutch, and cam means on said cam shaft for raising and lowering the frame carrying the egg spinning cups.

7. An egg candling machine comprising a main frame including a pair of spaced horizontal guide rails to receive a movable egg tray and to direct it through the machine, egg trays adapted to be moved along said guide rails, said egg trays each having a body formed with a row of openings within which eggs may seat, a ratchet bar carried by each tray, a feed head disposed adjacent said rails carrying a pawl to engage the teeth of said ratchet bar, a candling station including an illuminating unit, said unit including a pair of posts mounted to reciprocate vertically with relation to the frame and disposed at opposite sides thereof, a hood structure carried by said posts and extending horizontally across the top of the frame, illuminating means mounted within said hood, drive means for reciprocating said feed head to periodically feed a tray a predetermined distance along said rails to successively bring a row of eggs mounted in said openings of said tray to said candling station, means operable by said drive means to reciprocate said illuminating unit in timed sequence with the feeding movement of said trays, a spinning unit at said candling station comprising a vertically movable frame, a plurality of rotatable spindles carried by said frame equal in spacing and number to the openings of said row and disposed with parallel vertical axes in alignment with a row of tray openings when a tray is moved to the candling station, individual egg spinning cups mounted on the end of each spindle to engage an egg carried by the tray when the tray is lifted, a gear mounted on each of said spindles, intermediate idler gears rotatably supported on said frame and meshing with said spindle gears at opposite sides thereof forming a spindle drive train, means actuated by said driving means for lifting and lowering said unit between periods of motion of said tray and when a row of eggs is in registration with said cups, and means actuated by said drive means for imparting driving movement to the spindle gears when the frame is lifted.

JAMES W. JOHNSON.
DONALD Q. PARK.

REFERENCES CITED

The following references are of record in the file of this patent:

UNITED STATES PATENTS

| Number | Name | Date |
| --- | --- | --- |
| 1,202,455 | Turlington | Oct. 24, 1916 |
| 1,220,439 | McLellan et al. | Mar. 27, 1917 |
| 1,930,621 | Meyer | Oct. 17, 1933 |
| 2,284,991 | Sewell et al. | June 2, 1942 |